United States Patent
Chang

(10) Patent No.: US 11,301,385 B1
(45) Date of Patent: Apr. 12, 2022

(54) CACHE MANAGING METHOD AND SYSTEM BASED ON SESSION TYPE

(71) Applicant: INDUSTRIAL TECHNOLOGY RESEARCH INSTITUTE, Hsinchu (TW)

(72) Inventor: Chih-Kuang Chang, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/132,722

(22) Filed: Dec. 23, 2020

(30) Foreign Application Priority Data

Nov. 12, 2020 (TW) .................................. 109139486

(51) Int. Cl.
*G06F 12/0815* (2016.01)

(52) U.S. Cl.
CPC .. *G06F 12/0815* (2013.01); *G06F 2212/1024* (2013.01)

(58) Field of Classification Search
None
See application file for complete search history.

(56) References Cited

U.S. PATENT DOCUMENTS

| | | | |
|---|---|---|---|
| 9,451,298 B2 | 9/2016 | Yamagishi et al. | |
| 2011/0185043 A1* | 7/2011 | Zeller | H04L 67/10 709/219 |
| 2011/0191414 A1* | 8/2011 | Ma | H04L 67/02 709/203 |
| 2012/0054440 A1 | 3/2012 | Doig et al. | |
| 2014/0047183 A1 | 2/2014 | Chawla et al. | |
| 2014/0215082 A1* | 7/2014 | Backholm | H04L 51/30 709/227 |
| 2014/0244727 A1* | 8/2014 | Kang | H04L 65/80 709/203 |
| 2014/0281252 A1* | 9/2014 | Bastawala | G06F 12/0802 711/133 |
| 2015/0186287 A1 | 7/2015 | Kass | |
| 2018/0152438 A1* | 5/2018 | Liu | G06F 12/023 |
| 2019/0273803 A1* | 9/2019 | Ideguchi | H04L 67/146 |
| 2020/0004692 A1 | 1/2020 | Fan et al. | |
| 2020/0210340 A1 | 7/2020 | Zhang et al. | |
| 2021/0344771 A1* | 11/2021 | Cassidy | H04L 67/1008 |

FOREIGN PATENT DOCUMENTS

| | | |
|---|---|---|
| CN | 110019361 A | 7/2019 |
| TW | I224917 B | 12/2004 |
| TW | 200525432 A | 8/2005 |
| TW | 201717023 A | 5/2017 |

* cited by examiner

*Primary Examiner* — Kaushikkumar M Patel
(74) *Attorney, Agent, or Firm* — Birch, Stewart, Kolasch & Birch, LLP

(57) ABSTRACT

A cache managing method and system based on session type are provided. The cache memory includes several cache blocks. A cache manager has a trace table recording a priority of each cache block. The cache managing method includes the following steps. A request for a first data block is received from a first session, wherein the first session includes a first session type corresponding to a first priority. A cache block whose priority is lower than the first priority is assigned to the first session according to the trace table. The first data block is loaded to the assigned cache block. The priority of the assigned cache block of the trace table is updated to the first priority.

20 Claims, 6 Drawing Sheets

CACHE MANAGING METHOD AND SYSTEM BASED ON SESSION TYPE

This application claims the benefit of Taiwan application Serial No. 109139486, filed Nov. 12, 2020, the disclosure of which is incorporated by reference herein in its entirety.

TECHNICAL FIELD

The disclosure relates in general to a cache managing method and system, and more particularly to a cache managing method and system based on session type.

BACKGROUND

In the manufacturing industry, a manufacturing process normally includes several stages. To increase the production capacity and the product yield, each stage of the manufacturing process is adjusted through measurement, calculation and feedback control. Along with the popularity of manufacturing digitization and the evolution of the manufacturing process, the volume of measurement data becomes huge and the control rules are getting more and more complicated. That is, a large volume of data computation needs to be performed in the manufacturing process. Furthermore, the efficiency of data computation may directly affect the production capacity and the product yield.

To increase the efficiency of data computation, the existing technology normally performs data handshaking and data computation using a cache memory and a data computation acceleration unit. Since the cache memory is a limited and expensive resource, the cache memory needs to be managed more efficiently to improve the efficiency of data computation.

SUMMARY

According to one embodiment of the present disclosure, a cache managing method based on session type is provided. The cache memory includes several cache blocks. A cache manager has a trace table recording a priority of each cache block. The cache managing method includes the following steps. A request for a first data block is received from a first session, wherein the first session includes a first session type corresponding to a first priority. A cache block whose priority is lower than the first priority is assigned to the first session according to the trace table. The first data block is loaded to the assigned cache block. The priority of the assigned cache block of the trace table is updated to the first priority.

According to another embodiment of the present disclosure, a cache managing system based on session type is provided. The cache managing system based on session type can create a first session with an application, wherein the first session includes a first session type corresponding to a first priority. The cache managing system includes a data source, a cache memory and a cache manager. The data source stores several data blocks. The cache memory includes several cache blocks. The cache manager assigns the cache blocks and includes a trace table recording a priority of each cache block. The cache manager is configured to: assign a cache block whose priority is lower than the first priority to the first session according to the trace table when receiving a request for a first data block from the first session; load the first data block to the assigned cache block from the data source; and update the priority of the assigned cache block of the trace table to the first priority.

The above and other aspects of the disclosure will become better understood with regard to the following detailed description of the preferred but non-limiting embodiment(s). The following description is made with reference to the accompanying drawings.

DETAILED DESCRIPTION

Figure 1:
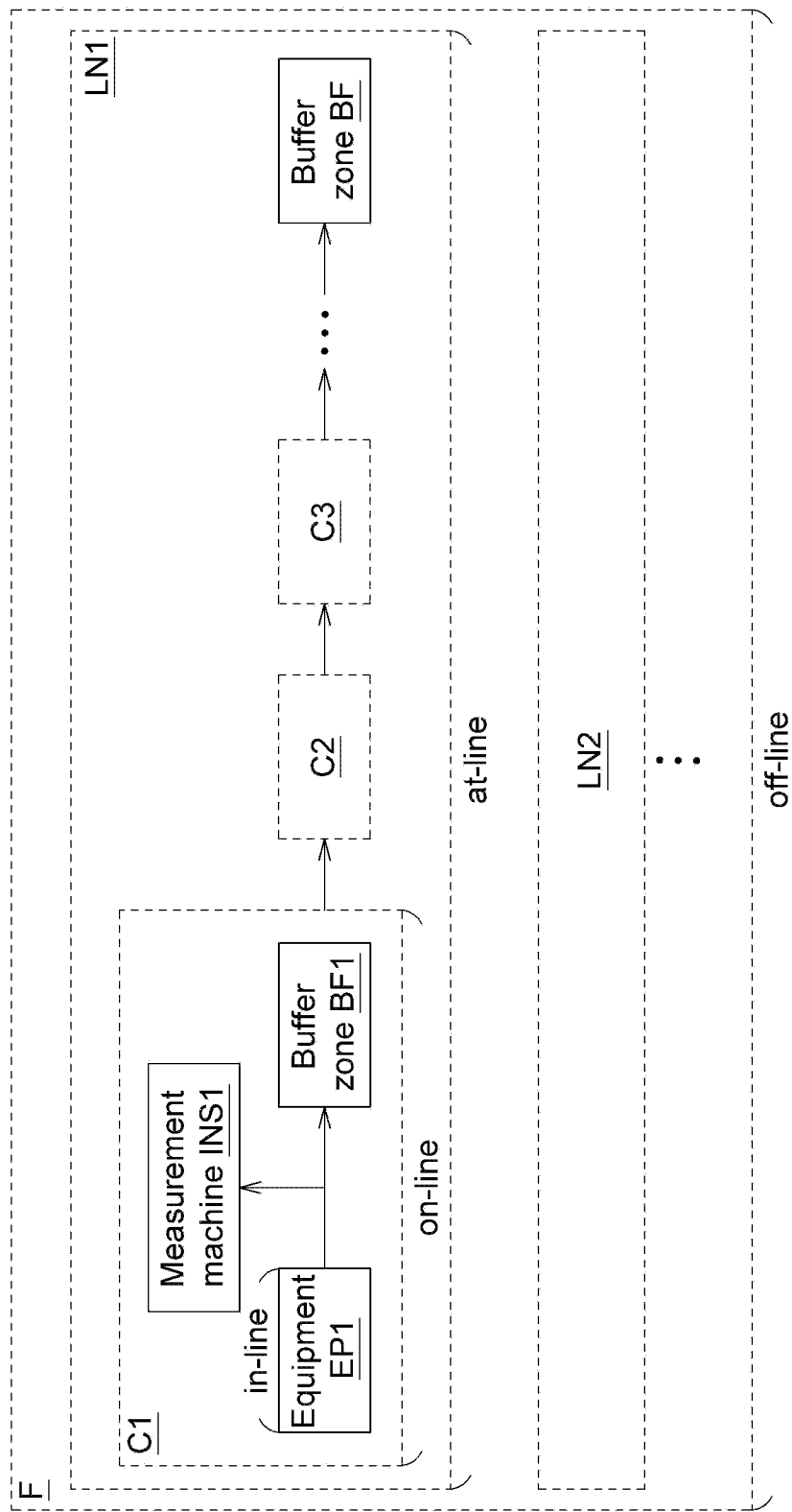
FIG. 1 is a schematic diagram of a manufacturing process of a manufacturing industry according to an embodiment of the disclosure.

Referring to FIG. 1, a schematic diagram of a manufacturing process of a manufacturing industry according to an embodiment of the disclosure is shown. A factory F includes several production lines LN1, LN2, . . . , etc. Each production line includes several workstations. For example, the production line LN1 includes workstations C1, C2, C3, . . . , etc. Each production line includes a buffer zone, at which the products manufactured in the production line are stored. For example, the production line LN1 includes a buffer zone BF. Each of the workstations can be composed of an equipment, a measuring machine and a buffer zone. For example, the workstation C1 is composed of an equipment EP1, a measuring machine INS1, and a buffer zone BF1. The buffer zone is used to store the products of the workstation.

In the manufacturing process, data computation in different zones of the production line has different timeliness requirements, and can be divided into four types according to the timeliness requirements. The four types are in-line type, on-line type, at-line and off-line. The data computation relevant to the interior of the equipment, the workstation, the production line, and the factory are in-line type, on-line type, at-line type, and off-line type, respectively. The immediacy requirements sorted in a descending order are in-line type, on-line type, at-line type and off-line type. Let an actual manufacturing field be taken for example. The in-line type relates to the inspection information obtained when a processing machine is performing a machining task. For example, the run-to-run (R2R) control in a chemical mechanical planarization (CMP) semiconductor process, the processing machine determines whether the processing parameters of the processing machine need to be adjusted according to the R2R inspection information. The in-line type has a high immediacy requirement. The on-line type relates to the inspection information of the output of a processing machine. For example, after a photographic processing is completed, an overlay measurement machine is used to inspect the overlay quality to determine whether to proceed to the next stage or to halt the conveyance of the front open unit pod (FOUP) for further inspection. The immediacy requirement of the on-line type is lower than that of the in-line type. The at-line type relates to the inspection information of phased products. For example, in the production line for metal mobile phone cases, critical dimensions of the material having completed the initial carving process are inspected using three-dimensional measurement to determine whether this batch of material can proceed to the fine carving process. The immediacy requirement of the at-line type is lower than that of the on-line type. The off-line type relates to the inspection information of finished products. For example, a defect inspection is performed on a finished wafer to determine whether the finished wafer passes or not. The immediacy requirement of the off-line type is lower than that of the at-line type.

Figure 2:
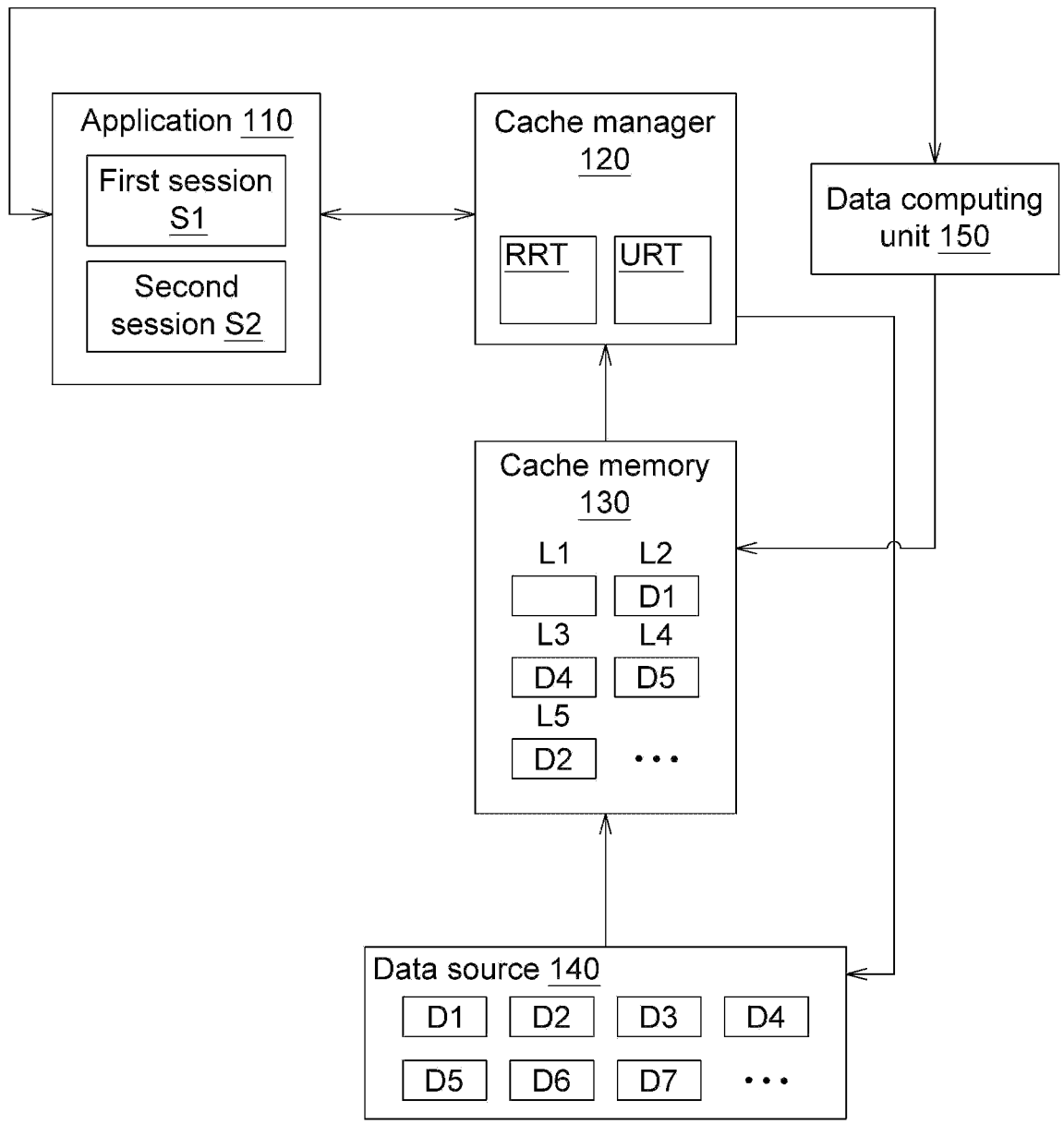
FIG. 2 is a schematic diagram of a cache managing system based on session type according to an embodiment of the disclosure.

Referring to FIG. 2, a schematic diagram of a cache managing system 100 based on session type according to an embodiment of the disclosure is shown. The cache managing system 100, which creates at least one session with an application 110, includes a cache manager 120, a cache memory 130, a data source 140 and a data computing unit 150. The cache memory 130 includes several cache blocks L1, L2, L3, L4, L5, . . . , etc. The data source 140 stores several data blocks D1, D2, D3, D4, D5, D6, D7, . . . , etc. The data blocks D1, D2, D3, D4, D5, D6, D7 . . . can be loaded to the cache blocks L1, L2, L3, L4, L5, . . . , etc. of the cache memory 130. The cache manager 120 includes a trace table URT and a session request record table RRT. In the present embodiment, the cache memory 130 can be realized by a static random-access memory (SRAM), and the data source 140 can be realized by a hard disc, a file or a database. Moreover, the application 110 can be executed by a factory management platform; the data computing unit 150 can be realized by a chip, a circuit, a graphics processing unit (GPU), a field programmable gate array (FPGA) or a GPU database; the cache manager 120 can be realized by a driver program or an application used to manage the memory.

The application 110 can create a session with a session type and can send a request for loading a data block. In the present embodiment, the application 110 creates a first session S1 and a second session S2. The session type is relevant with the immediacy requirement in data computation. In the present embodiment, the session type can be one of the in-line type, the on-line type, the at-line type and the off-line type. The session types have different priorities, and the corresponding priorities of the session types sorted in a descending order are the in-line type, the on-line type, the at-line type and the off-line type. The cache manager 120 can assign one of the cache blocks to a session according to the session type of the session and the trace table URT. For example, the cache manager 120 assigns one of the cache blocks to the first session S1 according to the session type of the first session S1 and the trace table URT. The data computing unit 150 accesses the assigned cache block to obtain and compute the requested data block, and further transmit the computing result to the session, such as the first session S1.

Referring to Table 1, a trace table URT according to an embodiment of the disclosure is shown. The trace table URT includes several columns recording relevant information of each of the cache blocks L1, L2, L3, L4, L5, . . . , etc. The "block" column of the trace table URT records and indicates the data block stored in the cache block. As indicated in the trace table URT, if the "block" column of the cache block L1 is N/A, this implies that the cache block L1 does not store any data block; if the "block" column of the cache block L2 is "D1", this implies that the cache block L1 stores the data block D1. The "locked" column of the trace table URT records the number of sessions, to which a cache block is assigned, and indicates that the data computing unit 150 is using the cache block for computation. For example, the trace table URT as indicated in Table 1 shows that the cache block L3 is assigned to 2 sessions and is being used by the data computing unit 150 for computation. The "priority" column of the trace table URT records the session type corresponding to the highest priority among the sessions having used the data stored in the cache block. For example, the session type corresponding to the highest priority among the sessions having used the data stored in the cache block L4 is the off-line type. The "session quantity" column of the trace table URT records the quantity of the sessions being using the cache block. For example, 1 session is using the cache block L5. The "expiry" column of the trace table URT records the final time at which the cache block is lastly locked. For example, the cache block L4 is lastly locked at T2. In the present specification, the timing sequence is represented by T1, T2, T3, . . . , etc., and the rest can be obtained by the same analogy.

TABLE 1

|  | L1 | L2 | L3 | L4 | L5 | ... |
|---|---|---|---|---|---|---|
| Block | N/A | D1 | D4 | D5 | D2 | ... |
| Locked | 0 | 1 | 2 | 0 | 0 | ... |
| Priority | N/A | in-line | at-line | off-line | on-line | ... |
| Session quantity | 0 | 2 | 3 | 0 | 1 | ... |
| Expiry | N/A | T3 | T3 | T2 | T1 | ... |

Figure 3:
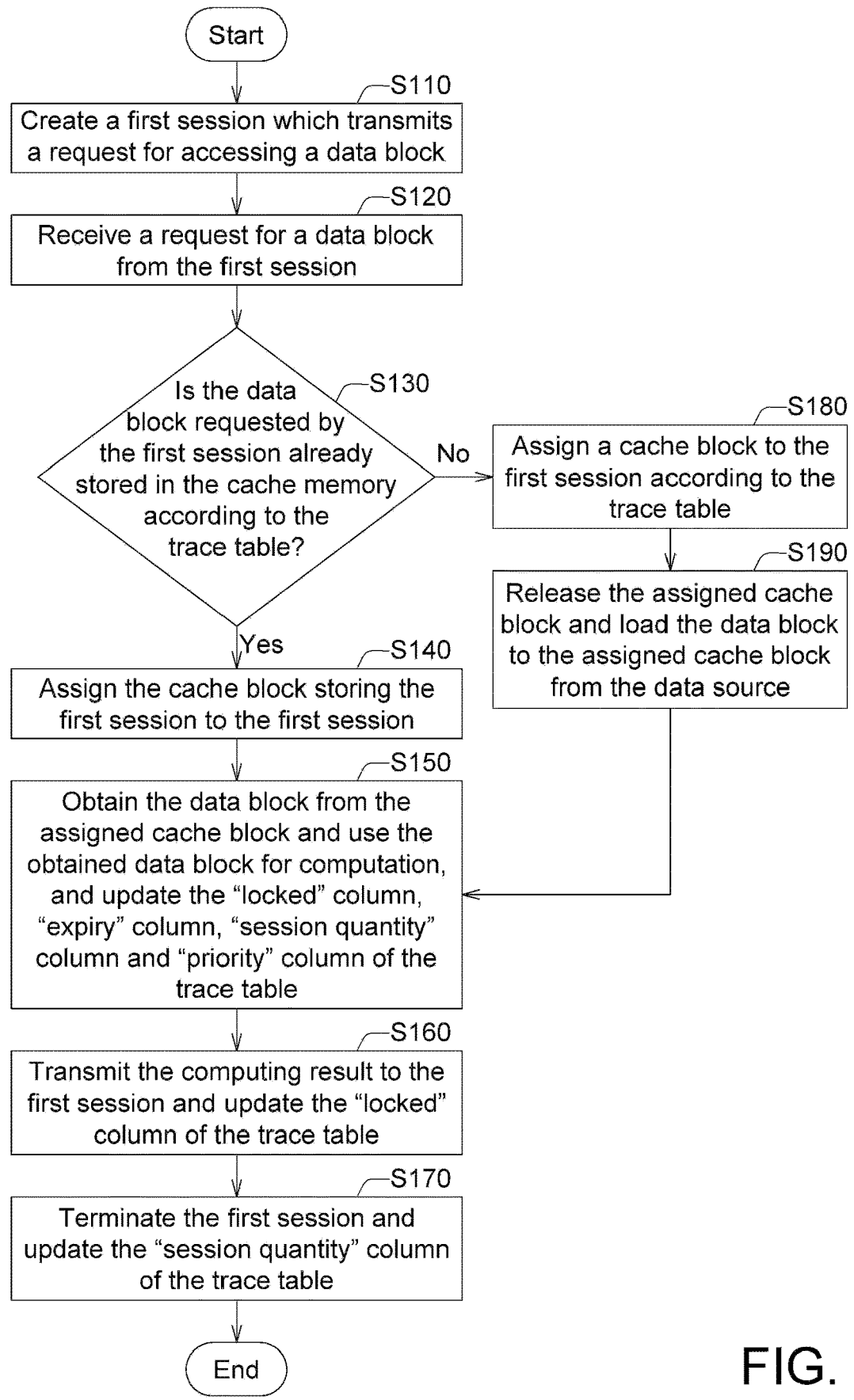
FIG. 3 is a flowchart of a cache managing method based on session type according to an embodiment of the disclosure.

FIG. 3 is a flowchart of a cache managing method based on session type according to an embodiment of the disclosure. Refer to FIGS. 2 and 3 and Table 1. Detailed descriptions of the steps of the cache managing method of the present embodiment are disclosed below. Firstly, the method begins at step S110, a first session S1 is created by the application 110, and a request for accessing a data block is transmitted by the first session S1. The first session S1 includes a first session type (on-line) corresponding to a first priority.

Next, the method proceeds to step S120, a request for loading a data block from the first session S1 is received by the cache manager 120.

Then, the method proceeds to step S130, whether the data block requested by the first session S1 is already stored in the cache memory 130 is determined by the cache manager 120 according to the trace table URT. When the data block requested by the first session S1 already exists in the cache memory 130, the method proceeds to step S140; when the data block requested by the first session S1 does not exist in the cache memory 130, the method proceeds to step S180.

For example, if the first session S1 requests for the data block D4, the cache manager 120 determines that the data block D4 is stored in the cache block L3 of the cache memory 130 according to the "block" column of the trace table URT as indicated in Table 1. That is, since the "block" column of the cache block L3 of the trace table URT is "D4", the cache manager 120 determines that that the data block requested by the first session S1 exists in the cache memory 130, and the method proceeds to step S140. In step S140, the cache block L3 storing the data block D4 requested by the first session S1 is assigned to the first session S1 by the cache manager 120.

Then, the method proceeds to step S150, the data block D4 is obtained from the assigned cache block L3 and used by the data computing unit 150 for computation, and the "locked" column, "expiry" column, "session quantity" column and "priority" column of the trace table URT are updated by the cache manager 120. For example, the trace table URT updated by the cache manager 120 is listed in Table 2. In the trace table URT as indicated in Table 2, the cache manager 120 updates the "locked" column corresponding to the assigned cache block L3 to 3 from 2, updates the "priority" column from the at-line type to the on-line type corresponding to the first session S1 with a higher priority, updates the "session quantity" column to 4 from 3, and updates the "expiry" column to the lastly locked time T4 from T3. In other words, when the cache manager 120 assigns the cache block L3 to the first session S1, the first session S1 notifies the data computing unit 150 to access data from the cache block L3, and the cache manager 120 further locks the cache block L3 and adds the "locked" column corresponding to the assigned cache block L3 by 1, updates the "expiry" column to the lastly locked time, and adds the value of the "session quantity" column by 1. Moreover, if the priority of the first session type (on-line) of the first session S1 is higher than the priority of the session type (at-line) recorded in Table 1, the cache manager 120 updates the "priority" column to the first session type (on-line). In another embodiment, if the first session type of the first session S1 is the at-line type or the off-line type and the first priority of the first session type is not higher than the priority (at-line) of the cache block L3 recorded in Table 1, then the "priority" column of the trace table URT will not be updated in the step S150.

TABLE 2

|  | L1 | L2 | L3 | L4 | L5 | ... |
|---|---|---|---|---|---|---|
| Block | N/A | D1 | D4 | D5 | D2 | ... |
| Locked | 0 | 1 | 3 | 0 | 0 | ... |
| Priority | N/A | in-line | on-line | off-line | on-line | ... |
| Session quantity | 0 | 2 | 4 | 0 | 1 | ... |
| Expiry | N/A | T3 | T4 | T2 | T1 | ... |

Then, the method proceeds to step S160, the computing result is transmitted to the first session S1 by the data computing unit 150, and the "locked" column of the trace table URT is updated by the cache manager 120. For example, the cache manager 120 updates the "locked" column of the cache block L3 of the trace table URT as indicated in Table 2, and the updated trace table URT is listed in Table 3. In Table 3, the value of the "locked" column of the cache block L3 is updated to 2 from 3. In other words, after the data computing unit 150 transmits the computing result to the first session S1 and finishes the computation using the cache block L3, the cache manager 120 deducts the value of the "locked" column corresponding to the cache block L3 of the trace table URT by 1.

TABLE 3

|  | L1 | L2 | L3 | L4 | L5 | ... |
|---|---|---|---|---|---|---|
| Block | N/A | D1 | D4 | D5 | D2 | ... |
| Locked | 0 | 1 | 2 | 0 | 0 | ... |
| Priority | N/A | in-line | on-line | off-line | on-line | ... |
| Session quantity | 0 | 2 | 4 | 0 | 1 | ... |
| Expiry | N/A | T3 | T4 | T2 | T1 | ... |

Then, the method proceeds to step S170, the first session S1 is terminated by the application 110, and the "session quantity" column of the trace table URT is updated by the cache manager 120. For example, after the application 110 terminates the first session S1, the cache manager 120 updates the "session quantity" column of the cache block L3 of the trace table URT as indicated in Table 3, and the updated trace table URT is listed in Table 4. In the trace table URT as indicated in Table 4, the session quantity of the cache block L3 is updated to 3 from 4. In other words, after the first session S1 is terminated, the cache manager 120 deducts the session quantity of the cache block L3 of the trace table URT by 1. In an embodiment, after the first session S1 is terminated, the cache manager 120 deducts the session quantity of each cache block corresponding to the first session S1 of the trace table URT by 1. In the present embodiment, through the session request record table RRT of Table 5, the cache manager 120 records the cache block requested by the first session S1. In the session request record table RRT of Table 5, the data block requested by the first session S1 includes data blocks D1 and D4. Therefore, after the first session S1 is terminated, the cache manager 120 deducts the session quantity of each of the cache blocks L2 and L3 corresponding to the first session S1 of the trace table URT of Table 3 by 1 according to the session request record table RRT of Table 5, and the updated trace table URT is listed in Table 6. In the present embodiment, the session request record table RRT records the data block requested by the session. However, the session request record table RRT can also record the cache block, to which the data block requested by the session is assigned.

TABLE 4

|  | L1 | L2 | L3 | L4 | L5 | ... |
|---|---|---|---|---|---|---|
| Block | N/A | D1 | D4 | D5 | D2 | ... |
| Locked | 0 | 1 | 2 | 0 | 0 | ... |
| Priority | N/A | in-line | on-line | off-line | on-line | ... |
| Session quantity | 0 | 2 | 3 | 0 | 1 | ... |
| Expiry | N/A | T3 | T4 | T2 | T1 | ... |

TABLE 5

| Session | Data block |
|---|---|
| S1 | D1, D4 |

TABLE 6

|  | L1 | L2 | L3 | L4 | L5 | ... |
|---|---|---|---|---|---|---|
| Block | N/A | D1 | D4 | D5 | D2 | ... |
| Locked | 0 | 1 | 2 | 0 | 0 | ... |
| Priority | N/A | in-line | on-line | off-line | on-line | ... |
| Session quantity | 0 | 1 | 3 | 0 | 1 | ... |
| Expiry | N/A | T3 | T4 | T2 | T1 | ... |

In step S110, when the first session S1 requests for accessing the data block D3, if the cache manager 120 determines that the data block D3 does not exist in the cache memory 130 according to the trace table URT of Table 1, the method proceeds to step S180. Since the requested data block D3 is not stored in the cache memory 130, the cache manager 120 needs to assign a cache block and load the data block D3 to the assigned cache block from the data source 140 for the first session S1 to use. When all cache blocks are used, the cache manager 120 needs to release the assigned cache block beforehand so that data can be loaded to the assigned cache block.

Figure 4:
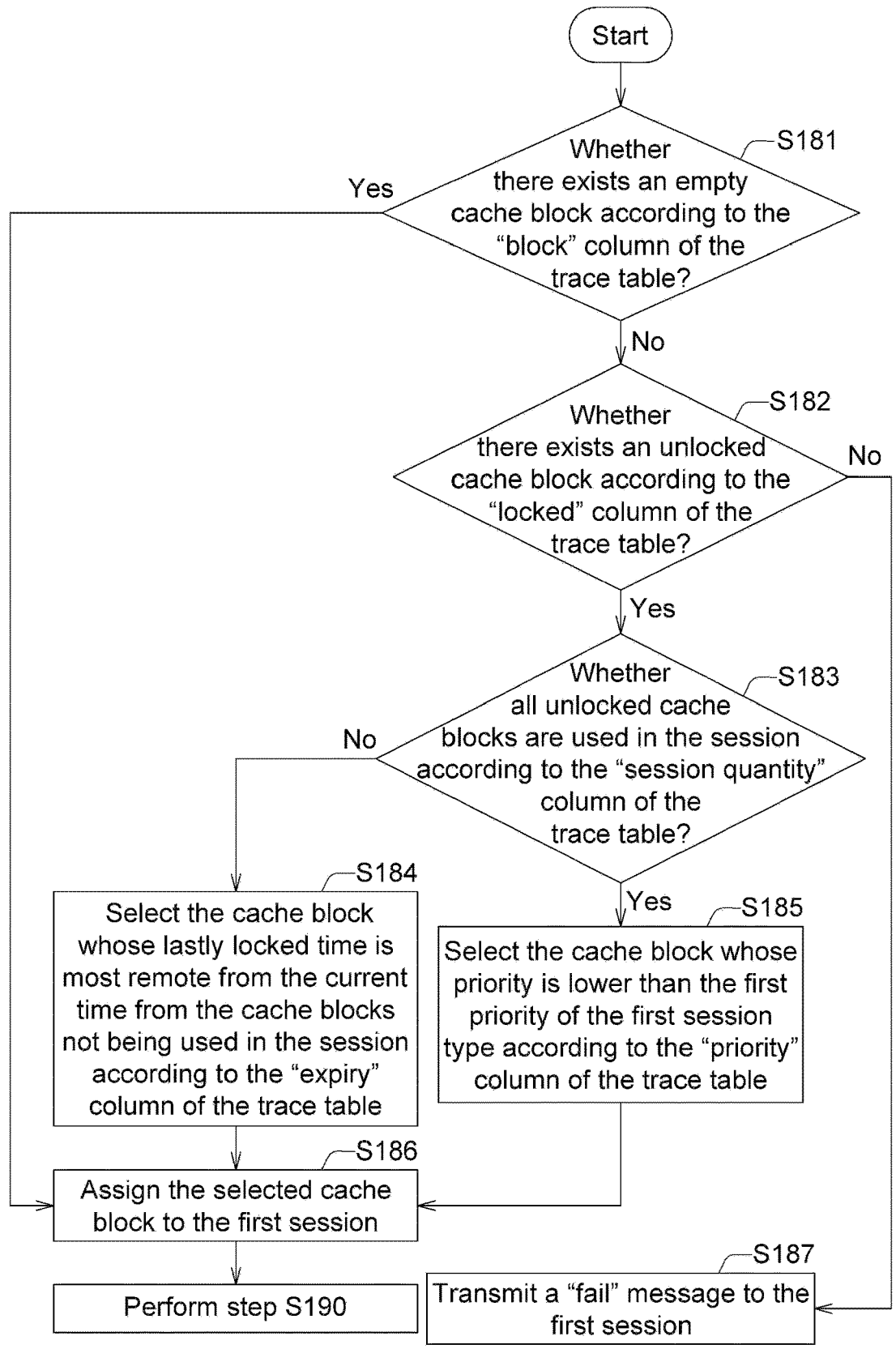
FIG. 4 is a flowchart of sub-steps of step S180 according to an embodiment of the disclosure.

In step S180, a cache block is assigned to the first session S1 by the cache manager 120 according to the trace table URT. Referring to FIG. 4, a flowchart of sub-steps of step S180 according to an embodiment of the disclosure is shown. In the present embodiment, step S180 includes sub-steps S181 to S187, wherein the cache manager 120 assigns one of the several cache blocks L1, L2, L3, L4, L5 to the first session S1 according to the trace table URT.

Then, the method proceeds to step S181, whether there exists an empty cache block is determined by the cache manager 120 according to the "block" column of the trace table URT. If there exists an empty cache block, the method proceeds to step S186. If there does not exist any empty cache blocks, the method proceeds to step S182. Refer to the trace table URT as indicated in Table 1. If the cache manager 120 determines that there exists an empty cache block (that is, the cache block L1) according to the "block" column of the trace table URT, the method proceeds to step S186, the cache block L1 is assigned to the first session S1 by the cache manager 120. In an embodiment, if the cache manager 120 determines that the trace table URT has more than one empty cache block, the cache manager 120 assigns one of the empty cache blocks to the first session S1 in step S186.

In step S181, if the cache manager 120 determines that the trace table URT as indicated in Table 7 does not have any empty cache blocks according to the "block" column of the trace table URT, the method proceeds to step S182. In step S182, whether there exists an unlocked cache block is determined by the cache manager 120 according to the "locked" column of the trace table URT. If it is determined that there exists an unlocked cache block, the method proceeds to step S183. If it is determined that there does not exist any unlocked cache blocks, the method proceeds to step S187, a "fail" message is transmitted to the first session S1 by the cache manager 120. Refer to the trace table URT as indicated in Table 7. If the cache manager 120 determines that there exists unlocked cache blocks L1, L2, and L5 according to the "block" column of the trace table URT, the method proceeds to step S183.

TABLE 7

|  | L1 | L2 | L3 | L4 | L5 | ... |
|---|---|---|---|---|---|---|
| Block | D6 | D1 | D4 | D5 | D2 | ... |
| Locked | 0 | 0 | 2 | 1 | 0 | ... |
| Priority | in-line | in-line | at-line | off-line | at-line | ... |
| Session quantity | 1 | 2 | 3 | 0 | 1 | ... |
| Expiry | T2 | T3 | T3 | T2 | T1 | ... |

In step S183, whether all unlocked cache blocks are used in the session is determined by the cache manager 120 according to the "session quantity" column of the trace table URT. If it is determined that all unlocked cache blocks are used in the session, the method proceeds to step S185. If it is determined not all unlocked cache blocks are used in the session, the method proceeds to step S184. For example, the cache manager 120 determines that the values of the "session quantity" column corresponding to the unlocked cache blocks L1, L2, and L5 are all greater than 0 (that is, the unlocked cache blocks L1, L2, and L5 are all used in the session) according to the "session quantity" column of the trace table URT as indicated in Table 7, the method proceeds to step S185.

In step S185, the cache block whose priority is lower than the first priority of the first session type is selected by the cache manager 120 according to the "priority" column of the trace table URT. For example, referring to the trace table URT as Table 7, the priority of the in-line type of the cache block L1 is not lower than the first priority of the first session type (on-line) of the first session S1, the priority of the in-line of the cache block L2 is not lower than the first priority of the first session type (on-line) of the first session S1, and the priority of the at-line type of the cache block L5 is lower than the first priority of the first session type (on-line) of the first session S1, therefore the cache manager 120 selects the cache block L5. Then, the method proceeds to step S186, the cache block L5 selected in step S185 is assigned to the first session S1 by the cache manager 120. In an embodiment, when step S185 is performed, if the quantity of the cache blocks whose priority is lower than the priority of the first session type is greater than 1, the cache manager 120 selects any one of the cache blocks whose priority is lower than the priority of the first session type, and assigns the selected cache block to the first session S1 in step S186.

Refer to the trace table URT as indicated in Table 8. In step S183, if it is determined by the cache manager 120 according to the "session quantity" column of the trace table URT that not all unlocked cache blocks L1, L2, and L5 are used in the session, the method proceeds to step S184. In step S184, the cache block whose lastly locked time is most remote from the current time is selected from the cache blocks not being used in the session by the cache manager 120 according to the "expiry" column of trace table URT. For example, the cache manager 120 selects the cache block L1 from the cache blocks L1 and L2 according to the "expiry" column of the trace table URT, wherein the cache blocks L1 and L2 are not being used in the session, and the lastly locked time of the cache block L1 is most remote from the current time. Then, the method proceeds to step S186, the cache block L1 is assigned to the first session S1 by the cache manager 120.

TABLE 8

|  | L1 | L2 | L3 | L4 | L5 | ... |
|---|---|---|---|---|---|---|
| Block | D6 | D1 | D4 | D5 | D2 | ... |
| Locked | 0 | 0 | 2 | 1 | 0 | ... |
| Priority | in-line | in-line | at-line | off-line | at-line | ... |
| Session quantity | 0 | 0 | 3 | 0 | 1 | ... |
| Expiry | T2 | T3 | T3 | T2 | T1 | ... |

Then, the method proceeds to step S190, the cache block assigned in step S180 is released by the cache manager 120, and the data block is loaded to the assigned cache block from the data source 140. Following step S190, steps S150 to S170 are sequentially performed. Steps S150 to S170 are already disclosed above and are not repeated here.

In the above disclosure, it is exemplified that the application 110 creates a first session S1 and the first session S1 requests for a data block. However, it should be noted that the first session S1 can transmit request for several times to access different data blocks. That is, the session can perform the cache managing method for several times. In another embodiment, after the application 110 creates the first session S1, the application 110 can further create a second session S2, which request for a data block. The second session S2 includes a second session type corresponding to a second priority. The data block requested by the second session S2 can be identical to or different from the data block requested by the first session S1, and the second priority of the second session type of the second session S2 can be identical to or different from the first priority of the first session type of the first session S1. Moreover, the application 110 can create the second session S2 before or after the first session S1 is terminated. Also, the second session S2 can be created by another application, and not limited to the disclosed embodiments. In the present embodiment, like the first session type, the second session type can be one of the in-line type, the on-line type, the at-line type and the off-line type.

Figure 5:
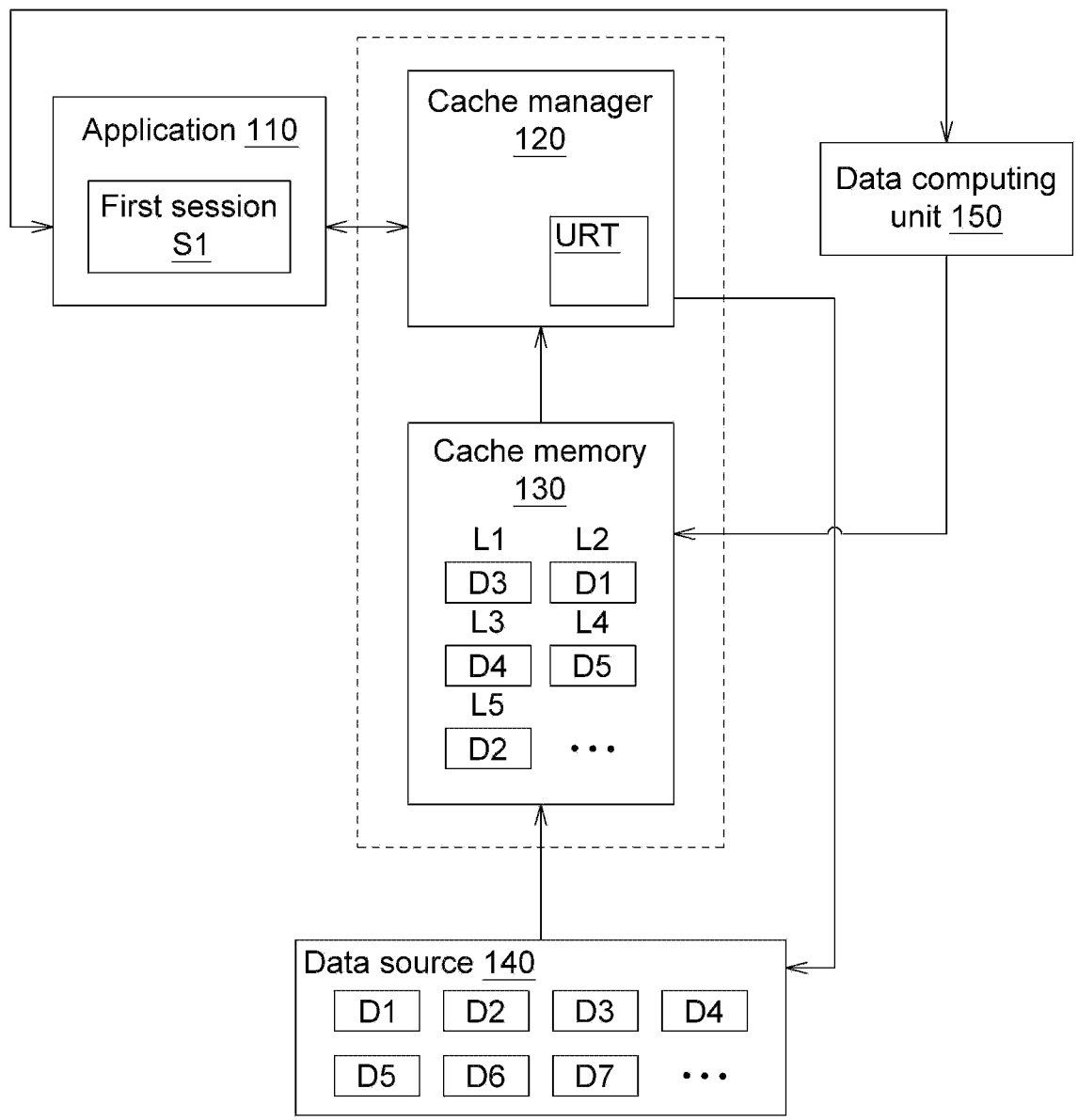
FIG. 5 is a schematic diagram of a cache managing system based on session type according to another embodiment of the disclosure.
Figure 6:
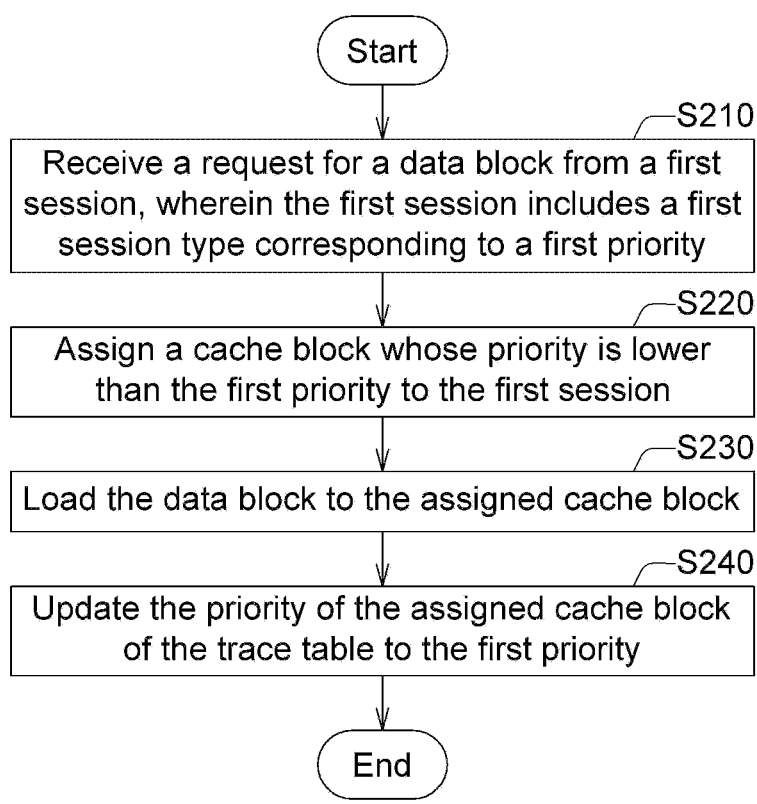
FIG. 6 is a flowchart of a cache managing method based on session type according to another embodiment of the disclosure.

Refer to FIGS. 5 and 6 and Table 9. FIG. 5 is a schematic diagram of a cache managing system 100 based on session type according to another embodiment of the disclosure. FIG. 6 is a flowchart of a cache managing method based on session type according to another embodiment of the disclosure. The cache managing system 100 based on session type creates a first session with the application 110, wherein the first session S1 includes a first session type corresponding to a first priority. The cache managing system 100 includes a cache manager 120, a cache memory 130 and a data source 140. The data source 140 stores several data blocks D1, D2, D3, D4, D5, D6, D7, . . . , etc. The cache memory 130 includes several cache blocks L1, L2, L3, L4, L5, . . . , etc. The cache manager 120, which assign the cache blocks L1, L2, L3, L4, L5, . . . , etc. to sessions, further includes a trace table URT as indicated in Table 9. The trace table URT records a priority of each of the cache blocks L1, L2, L3, L4, L5, . . . , etc. The cache manager 120 is configured to perform the following steps.

TABLE 9

|  | L1 | L2 | L3 | L4 | L5 | ... |
|---|---|---|---|---|---|---|
| Block | D6 | D1 | D4 | D5 | D2 | ... |
| Locked | 1 | 1 | 2 | 0 | 0 | ... |
| Priority | in-line | in-line | at-line | off-line | on-line | ... |
| Session quantity | 1 | 2 | 3 | 0 | 1 | ... |
| Expiry | Ti | T3 | T3 | T2 | T1 | ... |

In step S210, a request for loading the data block D3 is received from a first session S1 by the cache manager 120, wherein the first session S1 includes a first session type (at-line) corresponding to a first priority.

In step S220, a cache block L4 whose priority is lower than the first priority is assigned to the first session S1 by the cache manager 120 according to the trace table URT. Referring to Table 9, since the priority (off-line) of the cache block L4 is lower than the first priority of the first session type (at-line), the cache manager 120 assigns the cache block L4 to the first session S1.

In step S230, the data block D3 is loaded to the assigned cache block L4 by the cache manager 120.

In step S240, the priority of the assigned cache block L4 of the trace table URT is updated to the first priority by the cache manager 120. In the trace table URT as indicated in Table 10, the priority of the assigned cache block L4 is updated to the at-line type by the cache manager 120. Besides, in the trace table URT as indicated in Table 10, the cache manager 120 can also update the value of the "locked" column corresponding to the assigned cache block L4 to 1, update the session quantity to 1, update the expiry time to the lastly locked time T4, and update the "block" column to the data block D3.

TABLE 10

|  | L1 | L2 | L3 | L4 | L5 | ... |
|---|---|---|---|---|---|---|
| Block | D6 | D1 | D4 | D3 | D2 | ... |
| Locked | 1 | 1 | 2 | 1 | 0 | ... |
| Priority | in-line | in-line | at-line | at-line | on-line | ... |
| Session quantity | 1 | 2 | 3 | 1 | 1 | ... |
| Expiry | Ti | T3 | T3 | T4 | T1 | ... |

The cache managing method and cache managing system based on session type of the present disclosure can manage the cache memory according the priorities of the session types and the trace table for enabling data computation with higher priority to preferentially obtain computing resources and stay in the cache memory longer, such that the efficiency of data access and computation can be increased. Particularly, when used in the manufacturing process, the cache managing method and cache managing system based on session type of the present disclosure can manage the cache memory according to the immediacy requirement of data and data computation, such that the data computation required for measurement, calculation and feedback control can meet the operation requirements of the production line, such that the production line will not be idled due to data access, and the production capacity can be increased.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A cache managing method based on session type, wherein the cache managing method is used in a cache manager to access a cache memory comprising a plurality of cache blocks, the cache manager comprises a trace table recording a priority of each of the cache blocks, and the cache managing method comprises:

receiving a request for a first data block from a first session comprising a first session type corresponding to a first priority;

assigning a cache block whose priority is lower than the first priority to the first session according to the trace table;

loading the first data block to the assigned cache block; and updating the priority of the assigned cache block of the trace table to the first priority.

2. The cache managing method according to claim 1, wherein the first session type is in-line type, on-line type, at-line type or off-line type.

3. The cache managing method according to claim 2, wherein the priority of the in-line type is higher than the priority of the on-line type, the priority of the on-line type is higher than the priority of the at-line type, and the priority of the at-line type is higher than the priority of the off-line type.

4. The cache managing method according to claim 1, whereof the trace table further records a session quantity of each of the cache blocks, and the cache managing method further comprises:

updating the session quantity of the assigned cache block of the trace table to 1.

5. The cache managing method according to claim 4, further comprising:
   after the first session is terminated, deducting the session quantity of each of the cache blocks of the first session of the trace table by 1.

6. The cache managing method according to claim 1, further comprising:
   receiving a request for the first data block from a second session, wherein the second session comprises a second session type corresponding to a second priority;
   assigning the cache block storing the first data block to the second session according to the trace table; and
   if the second priority is higher than the first priority, updating the priority of the assigned cache block of the trace table to the second priority.

7. The cache managing method according to claim 6, whereof the trace table further records a session quantity of each of the cache blocks, and the cache managing method further comprises:
   after the cache block storing the first data block is assigned to the second session, adding the session quantity of the assigned cache block of the trace table by 1.

8. The cache managing method according to claim 7, further comprising:
   after the second session is terminated, deducting the session quantity of each of the cache blocks of the second session of the trace table by 1.

9. The cache managing method according to claim 1, whereof the trace table further records a session quantity of each of the cache blocks, and the cache managing method further comprises:
   receiving a request for a second data block from a second session, wherein the second session comprises a second session type corresponding to a second priority;
   assigning one of at least one cache block whose session quantity is 0 of the cache blocks to the second session according to the trace table;
   loading the second data block to the cache block assigned to the second session; and
   adding the session quantity of the cache block assigned to the second session of the trace table by 1.

10. The cache managing method according to claim 6, wherein the second session type is in-line type, on-line type, at-line type or off-line type; the priority of the in-line type is higher than the priority of the on-line type, the priority of the on-line type is higher than the priority of the at-line type, and the priority of the at-line type is higher than the priority of the off-line type.

11. A cache managing system based on session type, wherein the cache managing system can create a first session with an application, the first session comprises a first session type corresponding to a first priority, and the cache managing system comprises:
   a data source, which stores a plurality of data blocks;
   a cache memory, which comprises a plurality of cache blocks; and
   a cache manager, which assigns the cache blocks and comprises a trace table recording a priority of each of the cache blocks, wherein the cache manager is configured to:
      assign a cache block whose priority is lower than the first priority to the first session according to the trace table when receiving a request for a first data block from the first session,
      load the first data block to the assigned cache block from the data source, and
      update the priority of the assigned cache block of the trace table to the first priority.

12. The cache managing system according to claim 11, wherein the first session type is in-line type, on-line type, at-line type or off-line type.

13. The cache managing system according to claim 12, wherein the priority of the in-line type is higher than the priority of the on-line type, the priority of the on-line type is higher than the priority of the at-line type, and the priority of the at-line type is higher than the priority of the off-line type.

14. The cache managing system according to claim 11, whereof the trace table further records a session quantity of each of the cache blocks, and the cache manager is configured to:
   update the session quantity of the assigned cache block of the trace table is updated to 1.

15. The cache managing system according to claim 14, wherein the cache manager is configured to:
   after the application terminates the first session, deduct the session quantity of each of the cache blocks of the first session of the trace table by 1.

16. The cache managing system according to claim 11, wherein the application creates a second session comprising a second session type corresponding to a second priority, and the cache manager is configured to:
   assign the cache block storing the first data block to the second session according to the trace table when receiving a request for the first data block from the second session; and
   if the second priority is higher than the first priority, update the priority of the assigned cache block of the trace table to the second priority.

17. The cache managing system according to claim 16, whereof the trace table further records a session quantity of each of the cache blocks, and the cache manager is configured to:
   add the session quantity of the assigned cache block of the trace table by 1 after the cache block storing the first data block is assigned to the second session.

18. The cache managing system according to claim 17, wherein the cache manager is configured to:
   deduct the session quantity of each of the cache blocks of the second session of the trace table by 1 after the application terminates the second session.

19. The cache managing system according to claim 11, wherein the application creates a second session comprising a second session type corresponding to a second priority, the trace table further records a session quantity of each of the cache blocks, and the cache manager is configured to:
   assign one of at least one cache block whose session quantity is 0 of the cache blocks to the second session according to the trace table when receiving a request for a second data block from the second session;
   load the second data block to the cache block assigned to the second session from the data source; and
   add the session quantity of the cache block assigned to the second session of the trace table by 1.

20. The cache managing system according to claim 16, wherein the second session type is in-line type, on-line type, at-line type or off-line type; the priority of the in-line type is higher than the priority of the on-line type, the priority of the on-line type is higher than the priority of the at-line type, and the priority of the at-line type is higher than the priority of the off-line type.

* * * * *